United States Patent
Yamaki et al.

(10) Patent No.: US 9,435,044 B2
(45) Date of Patent: Sep. 6, 2016

(54) REINFORCED ELECTROLYTE MEMBRANE AND PROCESS FOR PRODUCING SAME

(71) Applicant: ASAHI GLASS COMPANY, LIMITED, Chiyoda-ku (JP)

(72) Inventors: Yasushi Yamaki, Chiyoda-ku (JP); Hiromitsu Kusano, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 14/467,192

(22) Filed: Aug. 25, 2014

(65) Prior Publication Data

US 2014/0360868 A1 Dec. 11, 2014

Related U.S. Application Data (63) Continuation of application No. PCT/JP2013/054964, filed on Feb. 26, 2013.

(30) Foreign Application Priority Data

Feb. 27, 2012 (JP) ................. 2012-039532

(51) Int. Cl.
| | | |
|---|---|---|
| *C25B 13/00* | (2006.01) | |
| *C25B 13/08* | (2006.01) | |
| *B01J 39/20* | (2006.01) | |
| *B01J 47/12* | (2006.01) | |
| *C08J 5/22* | (2006.01) | |
| *B01D 69/02* | (2006.01) | |

(52) U.S. Cl.
CPC ............... *C25B 13/08* (2013.01); *B01J 39/20* (2013.01); *B01J 47/12* (2013.01); *C08J 5/2206* (2013.01); *B01D 69/02* (2013.01); *C08J 2327/12* (2013.01)

(58) Field of Classification Search
CPC ....... C25B 13/00; C25B 13/02; C25B 13/04; C25B 13/08; B01D 69/00–69/148; H01M 2/14; H01M 2/16; H01M 2/1606; H01M 2/162; H01M 2/1626; H01M 2/1666; H01M 2/1686; H01M 2/18–2/185
USPC ................................. 204/295–296
See application file for complete search history.

(56) References Cited

U.S. PATENT DOCUMENTS

| | | | |
|---|---|---|---|
| 5,168,005 A | 12/1992 | Keating et al. | |
| 9,133,557 B2* | 9/2015 | Kameyama | ............ C25B 13/02 |
| 2002/0034904 A1* | 3/2002 | Sakuma et al. | ............... 442/194 |
| 2010/0098877 A1* | 4/2010 | Cooper et al. | ................ 427/551 |
| 2012/0074611 A1* | 3/2012 | Zhou et al. | .................. 264/164 |

FOREIGN PATENT DOCUMENTS

| | | |
|---|---|---|
| JP | 5-179477 | 7/1993 |
| JP | 7-233267 | 9/1995 |
| JP | 11-49877 | 2/1999 |
| JP | 2000-256486 | 9/2000 |
| JP | 2002-79114 | 3/2002 |
| JP | 2004-43594 | 2/2004 |
| WO | 2011/052538 | 5/2011 |

OTHER PUBLICATIONS

International Search Report issued in corresponding PCT/JP2013/054964, mailed Jun. 4, 2013.

* cited by examiner

*Primary Examiner* — Luan Van
*Assistant Examiner* — Alexander W Keeling
(74) *Attorney, Agent, or Firm* — Oblon, McCelland, Maier & Neustadt, L.L.P (57) ABSTRACT

A reinforced electrolyte membrane having an electrolyte membrane containing a fluoropolymer having ion exchange groups, reinforced by a woven fabric made of a reinforcing thread and a sacrificial thread, where the sacrificial thread remains in the electrolyte membrane, a void is formed between the sacrificial thread and the electrolyte membrane, and $2000\ \mu m^2 < A < 6000\ \mu m^2$ and $0.3 \le B/A < 1.0$ are satisfied, where A is the total of a cross-sectional area of the sacrificial thread and a cross-sectional area of the void, and B is the cross-sectional area of the sacrificial thread.

9 Claims, 1 Drawing Sheet

REINFORCED ELECTROLYTE MEMBRANE AND PROCESS FOR PRODUCING SAME

TECHNICAL FIELD

The present invention relates to a reinforced electrolyte membrane reinforced by a woven fabric, used as e.g. an ion exchange membrane to be used for alkali chloride electrolysis, and a process for producing the same.

BACKGROUND ART

As an ion exchange membrane to be used for alkali chloride electrolysis which comprises electrolyzing an aqueous alkali chloride solution such as seawater and thereby producing an alkali hydroxide and chlorine, an electrolyte membrane made of a fluoropolymer having ion exchange groups (such as carboxylic acid type functional groups or sulfonic acid type functional groups) has been known.

As the electrolyte membrane, a reinforced electrolyte membrane reinforced by a woven fabric made of a reinforcing thread (such as a thread of polytetrafluoroethylene (hereinafter referred to as PTFE)) is usually used with a view to maintaining mechanical strength or dimension stability. However, the reinforced electrolyte membrane having an electrolyte membrane reinforced by a woven fabric made of e.g. a thread of PTFE tends to have a high membrane resistance, whereby the electrolysis voltage tends to increase.

In order to suppress the membrane resistance of the reinforced electrolyte membrane at a low level and thereby suppress the increase of the electrolysis voltage, it is necessary to increase the open area ratio of a woven fabric. However, if the open area ratio of a woven fabric is increased, misalignment tends to occur at an opening portion of the woven fabric, and therefore it is difficult to produce a woven fabric or insert it in an electrolyte membrane.

Accordingly, a method of employing a woven fabric obtained by mixedly weaving a thread of PTFE and a sacrificial thread (such as a thread of polyethylene terephthalate (hereinafter, referred to as PET)) which is soluble in an aqueous alkaline solution, has been proposed (Patent Documents 1 and 2).

A sacrificial thread is eluted in an alkaline aqueous solution and removed (i) when a reinforced precursor membrane having a precursor membrane containing a fluoropolymer having precursor groups for the ion exchange groups reinforced by a woven fabric, is immersed in an alkaline aqueous solution, whereby the precursor groups are hydrolyzed and converted into the ion exchange groups to produce a reinforced electrolyte membrane or (ii) when the reinforced electrolyte membrane is disposed in an electrolytic cell to carry out conditioning operation before regular operation of alkali chloride electrolysis, and therefore the sacrificial thread does not affect the membrane resistance at the time of the regular operation of the alkali chloride electrolysis using a reinforced electrolyte membrane.

PRIOR ART DOCUMENTS
Patent Documents

Patent Document 1: JP-A-7-233267
Patent Document 2: JP-A-2000-256486

DISCLOSURE OF INVENTION

Technical Problem

However, most of the sacrificial thread is eluted in an aqueous alkaline solution and removed at the time of (i), whereby a void is formed in the portion where the sacrificial thread was previously present in a reinforced electrolyte membrane, and therefore a mechanical strength of the reinforced electrolyte membrane tends to deteriorate. Accordingly, breakage such as cracking is likely to occur to a reinforced electrolyte membrane due to external force at the time of handling the reinforced electrolyte membrane during a period between after production of the reinforced electrolyte membrane and before conditioning operation or at the time of disposing the reinforced electrolyte membrane in an electrolytic cell at the time of conditioning operation.

Further, a reinforced electrolyte membrane will not be influenced by large external force after the reinforced electrolyte membrane is disposed in an electrolytic cell, and therefore breakage such as cracking is less likely to occur to the reinforced electrolyte membrane even when the sacrificial thread is completely eluted in an aqueous alkaline solution and removed at the time of (ii).

The present invention provides a reinforced electrolyte membrane to which breakage such as cracking is less likely to occur at the time of handling the reinforced electrolyte membrane during a period between after production of the reinforced electrolyte membrane and before conditioning operation of alkali chloride electrolysis or at the time of disposing the reinforced electrolyte membrane in an electrolytic cell at the time of conditioning operation, and a process for producing the same.

Solution to Problem

The reinforced electrolyte membrane of the present invention is a reinforced electrolyte membrane having an electrolyte membrane containing a fluoropolymer having ion exchange groups, reinforced by a woven fabric made of a reinforcing thread and a sacrificial thread, wherein
    the sacrificial thread remains in the electrolyte membrane,
    a void is formed between the sacrificial thread and the electrolyte membrane, and
    the following formulae (1) and (2) are satisfied, wherein A is the total of a cross-sectional area of the sacrificial thread and a cross-sectional area of the void, and B is the cross-sectional area of the sacrificial thread:

$$2000\ \mu m^2 < A < 6000\ \mu m^2 \tag{1}$$

$$0.3 \leq B/A < 1.0 \tag{2}$$

The reinforced electrolyte membrane of the present invention preferably satisfies the following formula (1'):

$$2000\ \mu m^2 < A < 4000\ \mu m^2 \tag{1'}$$

The sacrificial thread is preferably a thread containing at least one member selected from the group consisting of polyethylene terephthalate, polybutylene terephthalate, polytrimethylene terephthalate, rayon and cellulose.

The sacrificial thread is preferably a thread of polyethylene terephthalate, a thread made of a mixture of polyethylene terephthalate and polybutylene terephthalate, a thread of polybutylene terephthalate or a thread of polytrimethylene terephthalate.

The process for producing a reinforced electrolyte membrane of the present invention is a process for producing the reinforced electrolyte membrane of the present invention, which comprises bringing a reinforced precursor membrane having a precursor membrane containing a fluoropolymer having precursor groups for the ion exchange groups reinforced by a woven fabric made of a reinforcing thread and a sacrificial thread, into contact with an aqueous alkaline solution, thereby hydrolyzing and converting the precursor groups into the ion exchange groups to produce the reinforced electrolyte membrane.

In the process for producing a reinforced electrolyte membrane of the present invention, at the time of bringing the reinforced precursor membrane into contact with an aqueous alkaline solution, only a part of the sacrificial thread is preferably hydrolyzed and eluted in the aqueous alkaline solution so as to satisfy the above formula (2).

Advantageous Effects of Invention

According to the reinforced electrolyte membrane of the present invention, breakage such as cracking is less likely to occur at the time of handling the reinforced electrolyte membrane during a period between after production of the reinforced electrolyte membrane and before conditioning operation of alkali chloride electrolysis or at the time of disposing the reinforced electrolyte membrane in an electrolytic cell at the time of conditioning operation.

According to the process for producing a reinforced electrolyte membrane of the present invention, it is possible to produce a reinforced electrolyte membrane to which breakage such as cracking is less likely to occur at the time of handling the reinforced electrolyte membrane during a period between after production of the reinforced electrolyte membrane and before conditioning operation of alkali chloride electrolysis or at the time of disposing the reinforced electrolyte membrane in an electrolytic cell at the time of conditioning operation.

DESCRIPTION OF EMBODIMENTS

<Reinforced Electrolyte Membrane>

Figure 1:
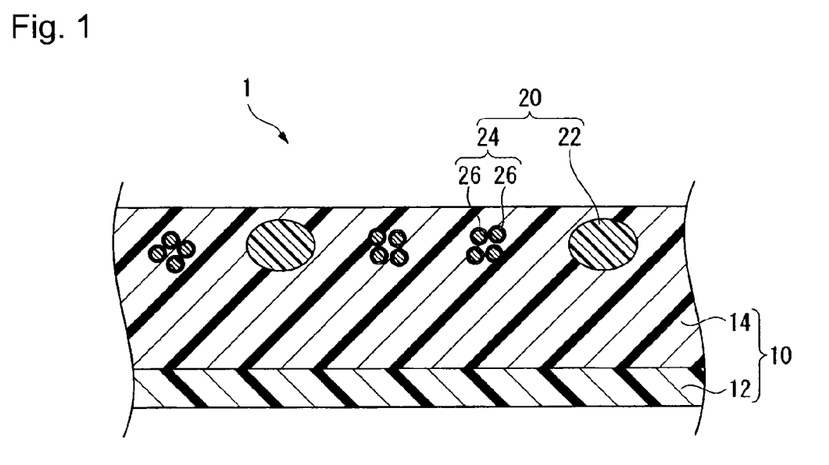
FIG. 1 is a cross-sectional view illustrating one example of the reinforced electrolyte membrane of the present invention.

FIG. 1 is a cross-sectional view illustrating one example of the reinforced electrolyte membrane of the present invention. A reinforced electrolyte membrane 1 is one having an electrolyte membrane 10 containing a fluoropolymer having ion exchange groups reinforced by a woven fabric 20.

(Electrolyte Membrane)

The electrolyte membrane 10 is a laminate composed of a layer (hereinafter, referred to as a first layer 12) made of a fluoropolymer having carboxylic acid type functional groups, as a functional layer which achieves a high current efficiency, and a layer (hereinafter, referred to as a second layer 14) made of a fluorocopolymer having sulfonic acid type functional groups, as a layer which maintains a mechanical strength.

(First Layer)

The fluoropolymer having carboxylic acid type functional groups may be a copolymer of units derived from a fluoromonomer having a carboxylic acid type functional group and units derived from a fluoroolefin. The carboxylic acid type functional group is a carboxyl group (—COOH) itself or —COOM (wherein M is an alkali metal or a quaternary ammonium salt group).

The fluoropolymer having carboxylic acid type functional groups is obtained by converting precursor groups of the after-mentioned fluoropolymer having the precursor groups for carboxylic acid type functional groups, into the carboxylic acid type functional groups in the after-mentioned step (b).

The thickness of the first layer 12 is preferably from 5 to 50 μm, more preferably from 10 to 35 μm. When the thickness of the first layer 12 is at least 5 μm, it is possible to achieve a high current efficiency, and further it is possible to reduce the amount of sodium chloride in sodium hydroxide as a product in a case where sodium chloride electrolysis is carried out. When the thickness of the first layer 12 is at most 50 μm, the membrane resistance of the reinforced electrolyte membrane 1 is suppressed to be sufficiently low, and the increase of the electrolysis voltage can be sufficiently suppressed.

(Second Layer)

The second layer 14 is a laminate structure made of an upper layer and a lower layer so that the woven fabric 20 is embedded in the second layer 14. Into between the upper layer and the lower layer of the second layer 14, the woven fabric 20 is inserted so as to be embedded.

The fluoropolymer having sulfonic acid type functional groups may be a copolymer of units derived from a fluoromonomer having a sulfonic acid type functional group and units derived from a fluoroolefin. The sulfonic acid type functional group is a sulfonic acid group (—SO$_3$H) itself or —SO$_3$M (wherein M is an alkali metal or a quaternary ammonium salt group).

The fluoropolymer having sulfonic acid type functional groups is obtained by converting precursor groups of the after-mentioned fluoropolymer having the precursor groups for sulfonic acid type functional groups, into the sulfonic acid type functional groups, in the after-mentioned step (b).

The thickness of the lower layer of the second layer 14 is preferably from 30 to 140 μm, more preferably from 30 to 100 μm. When the thickness of the lower layer of the second layer 14 is at least 30 μm, the mechanical strength of the electrolyte membrane 10 sufficiently increases. When the thickness of the lower layer of the first layer 12 is at most 140 μm, the membrane resistance of the reinforced electrolyte membrane 1 is suppressed to be sufficiently low, and the increase of the electrolysis voltage can be sufficiently suppressed.

The thickness of the upper layer of the second layer 14 is preferably from 10 to 60 μm, more preferably from 10 to 40 μm. When the thickness of the upper layer of the second layer 14 is at least 10 μm, the woven fabric 20 is accommodated in the electrolyte membrane 10, whereby the delamination resistance of the woven fabric 20 improves, the woven fabric 20 is not excessively close to the surface of the electrolyte membrane 10, the electrolyte membrane 10 is less likely to have cracking on the surface, and as a result, the decrease of the mechanical strength can be suppressed. When the thickness of the upper layer of the first layer 12 is at most 60 μm, the membrane resistance of the reinforced electrolyte membrane 1 is suppressed to be sufficiently low, and the increase of the electrolysis voltage can be sufficiently suppressed.

(Woven Fabric)

The woven fabric 20 is a reinforcing material to reinforce the electrolyte membrane 10, which is usually inserted into between the upper layer and the lower layer of the second layer 14 so as to be embedded in the second layer 14.

The woven fabric 20 is a fabric made of a reinforcing thread 22 and a sacrificial thread 24.

The density (number of thread) of the woven fabric 20 is preferably from 3 to 50 number/cm, more preferably from 8 to 30 number/cm. When the density of the reinforcing thread 22 is at least 3 number/cm, the mechanical strength as the reinforcing material sufficiently increases. When the density of the reinforcing thread 22 is at most 50/cm, the membrane resistance of the reinforced electrolyte membrane 1 is suppressed to be sufficiently low, and the increase of the electrolysis voltage is sufficiently suppressed.

The density of the sacrificial thread 24 is set to be an even multiple of the density of the reinforcing thread 22. If it is set to be an odd multiple, warps and wefts of the reinforcing thread 22 are not alternately crossed one above the other, whereby a fabric texture is not formed after the sacrificial thread 24 is eluted. The density of the sacrificial thread 24 is preferably from two to ten times among the even multiple of the density of the reinforcing thread 22.

The total density of the reinforcing thread 22 and the sacrificial thread 24 is preferably from 20 to 100 number/cm since weaving is easy and misalignment is unlikely to occur.

The open area ratio of the woven fabric comprising solely the reinforcing thread 22 after the sacrificial thread 24 is eluted, is preferably from 70 to 90%, more preferably form 80 to 90%. When the open area ratio of the woven fabric is at least 70%, the membrane resistance of the reinforced electrolyte membrane 1 can be suppressed to be sufficiently low, and the increase of the electrolysis voltage can be sufficiently suppressed. When the open area ratio of the woven fabric is at most 90%, the mechanical strength as a reinforcing material sufficiently increases.

The open area ratio of the woven fabric can be obtained from an optical microscopic photograph.

The thickness of the woven fabric 20 is preferably from 5 to 40 μm, more preferably from 5 to 35 μm. When the thickness of the woven fabric 20 is at least 5 μm, the mechanical strength as a reinforcing material sufficiently increases. When the thickness of the woven fabric 20 is at most 40 μm, a thickness of a thread intersection can be suppressed, whereby it is possible to sufficiently suppress the influence of the increase of the electrolysis voltage due to current shielding of the woven fabric 20.

(Reinforcing Thread)

The reinforcing thread 22 maintains the mechanical strength or the dimensional stability of the reinforced electrolyte membrane 1 as a remaining thread constituting the woven fabric, after the sacrificial thread is eluted.

The reinforcing thread 22 is preferably one having a resistance to high temperature in alkali chloride electrolysis, chlorine, sodium hypochlorite or sodium hydroxide.

The reinforcing thread 22 is preferably a thread containing a fluoropolymer, more preferably a thread containing a perfluorocarbon polymer, furthermore preferably a thread containing PTFE, particularly preferably a thread of PTFE made solely of PTFE, in view of mechanical strength, heat resistance and chemical resistance.

The reinforcing thread 22 may be a monofilament or a multifilament. When the reinforcing thread 22 is a thread of PTFE, a monofilament is preferred, and a tape yarn obtained by slitting a PTFE film is more preferred from the viewpoint that spinning is easy.

The fineness of the reinforcing thread 22 is preferably from 25 to 400 denier, more preferably from 50 to 200 denier. When the fineness of the reinforcing thread 22 is at least 25 denier, the mechanical strength sufficiently increases. When the fineness of the reinforcing thread 22 is at most 400 denier, the membrane resistance of the reinforced electrolyte membrane 1 can be suppressed to be sufficiently low, and the increase of the electrolysis voltage can be sufficiently suppressed. Further, the reinforcing thread 22 is not excessively close to the surface of the electrolyte membrane 10, the electrolyte membrane 10 is less likely to have cracking on the surface, and as a result, the decrease of the mechanical strength can be suppressed.

(Sacrificial Thread)

The sacrificial thread 24 is one a part of which is eluted in an aqueous alkaline solution (i) when a reinforced precursor membrane having a precursor membrane containing a fluoropolymer having precursor groups for the ion exchange groups reinforced by the woven fabric 20, is immersed in an alkaline aqueous solution, whereby the precursor groups are hydrolyzed and converted into the ion exchange groups to produce the reinforced precursor membrane 1 and further one a remaining part of which is completely eluted in an aqueous alkaline solution and removed (ii) when the reinforced electrolyte membrane 1 is disposed in an electrolytic cell to carry out conditioning operation before regular operation of alkali chloride electrolysis.

The sacrificial thread in the present invention is defined as one all of which is to be eluted in an aqueous sodium hydroxide solution by immersing a reinforced electrolyte membrane in a 32 mass % sodium hydroxide aqueous solution at 25° C. for 24 hours. When all of the sacrificial thread is eluted in the sodium hydroxide aqueous solution under such conditions, the sacrificial thread is entirely eluted in an aqueous alkaline solution and removed when the reinforced electrolyte membrane is disposed in an electrolytic cell to carry out conditioning operation before regular operation of alkali chloride electrolysis.

The sacrificial thread 24 is preferably a thread containing at least one member selected from the group consisting of PET, polybutylene terephthalate (hereinafter referred to as PBT), polytrimethylene terephthalate (hereinafter referred to as PTT), rayon and cellulose, more preferably a thread of PET made solely of PET, a thread of PET/PBT made of a mixture of PET and PBT, a thread of PBT made solely of PBT, or a thread of PTT made solely of PTT.

The sacrificial thread 24 is preferably a thread of PET from the viewpoint of cost. The sacrificial thread 24 is preferably a thread of PBT or a thread of PTT, particularly preferably a thread of PTT, from the viewpoints that it is hardly eluted in an aqueous alkaline solution at the time of (i) and that it is possible to obtain the reinforced electrolyte membrane 1 having sufficiently high mechanical strength. The sacrificial thread 24 is preferably a thread of PET/PBT in view of balance between a cost and a mechanical strength of the reinforced electrolyte membrane 1.

The sacrificial thread 24 may be a multifilament having a plurality of filaments 26 gathered as shown in FIG. 1, or a monofilament. A multifilament is preferred from the viewpoints that a contact area with an aqueous alkaline solution increases and that the sacrificial thread 24 is easily eluted in an aqueous alkaline solution at the time of (ii).

In a case where the sacrificial thread 24 is a multifilament, the number of the filaments 26 per the sacrificial thread 24 is preferably from 2 to 12, more preferably from 2 to 8. When the number of the filaments 26 is at least two, the sacrificial thread 24 is readily eluted in an aqueous alkaline solution at the time of (ii). When the number of the filaments 26 is at most 12, the fineness of the sacrificial thread 24 does not tend to be higher than required.

The fineness of the sacrificial thread 24 is preferably from 1 to 20 denier, more preferably from 3 to 9 denier before (i). When the fineness of the sacrificial thread 24 is at least 1 denier, the mechanical strength sufficiently increases, and the woven fabric property sufficiently increases. When the fineness of the sacrificial thread 24 is at most 20 denier, pores formed after the sacrificial thread 24 is eluted are not excessively close to the surface of the electrolyte membrane 10, the electrolyte membrane 10 is less likely to have cracking on the surface, and as a result, the decrease of the mechanical strength can be suppressed.

(Void)

Figure 2:
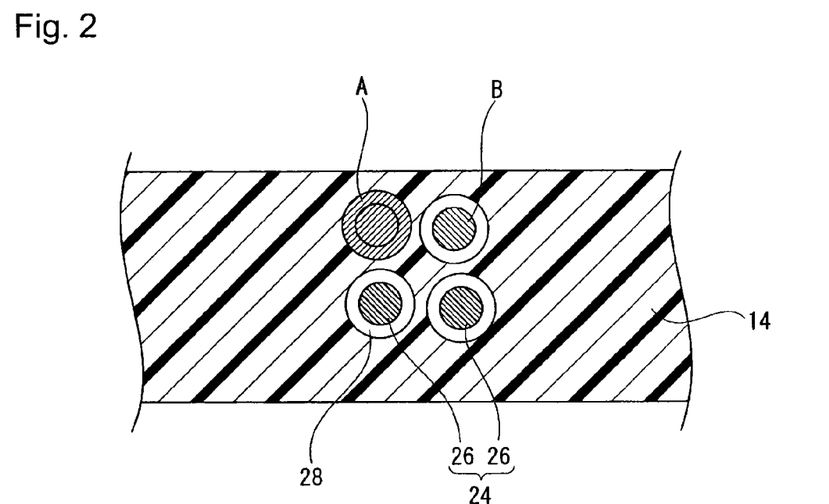
FIG. 2 is an enlarged cross-sectional view near the surface of the reinforced electrolyte membrane shown in FIG. 1.

In the electrolyte membrane 10, the sacrificial thread 24 remains even after (i), and around the filament 26 of the sacrificial thread 24, a void 28 is formed between the filament 26 and the electrolyte membrane 10 as shown in FIG. 2.

The reinforced electrolyte membrane 1 satisfies the following formula (1), preferably satisfies the following formula (1'), wherein A is the total of a cross-sectional area of the filament 26 of the sacrificial thread 24 and a cross-sectional area of the void 28, and B is a cross-sectional area of the filament 26 of the sacrificial thread 24.

$$2000 \ \mu m^2 < A < 6000 \ \mu m^2 \quad (1)$$

$$2000 \ \mu m^2 < A < 4000 \ \mu m^2 \quad (1')$$

When A is less than 6,000 $\mu m^2$, the void 28 is not excessively close to the surface of the electrolyte membrane 10, the electrolyte membrane 10 is less likely to have cracking on the surface, and as a result, the decrease of the mechanical strength can be suppressed. From the restriction at the time of spinning the filament 26, it is difficult to obtain the filament 26 having a cross-sectional area of at most 2,000 $\mu m^2$, that is, it is impossible to form pores having at most 2,000 $\mu m^2$ of A.

Further, the reinforced electrolyte membrane 1 satisfies the following formula (2), preferably the following formula (2').

$$0.3 \leq B/A < 1.0 \quad (2)$$

$$0.6 \leq B/A \leq 0.95 \quad (2')$$

When B/A is at least 0.3, the sacrificial thread 24 sufficiently remains, and the mechanical strength of the reinforced electrolyte membrane 1 is sufficient. The larger the B/A, the better it is, but a part of the sacrificial thread 24 is necessarily eluted in an aqueous alkaline solution at the time of (i), and therefore it is impossible to achieve B/A=1.0.

A cross-sectional area of the sacrificial thread and a cross-sectional area of the void are ones obtained in such a manner that the cross-sectional area of the reinforced electrolyte membrane dried at 90° C. for at least 2 hours is observed by a scanning electron microscope (hereinafter referred to as SEM), cross-sectional areas of sacrificial threads (filaments in the case of multifilaments) and voids around them are measured by means of an image soft, and cross-sectional areas of four sacrificial threads (four filaments in the case of multifilaments) and voids around them are averaged.

(Operation and Effect)

As described above, the reinforced electrolyte membrane 1 is excellent in mechanical strength, since the sacrificial thread 24 remains in the electrolyte membrane 10, and the above formulae (1) and (2) are satisfied when A is the total of a cross-sectional area of the sacrificial thread 24 and a cross-sectional area of the void 28 formed around the sacrificial thread 24, and B is the cross-sectional area of the sacrificial thread. Accordingly, breakage such as cracking is less likely to occur at the time of handling the reinforced electrolyte membrane 1 during a period between after production of the reinforced electrolyte membrane 1 and before conditioning operation of alkali chloride electrolysis or at the time of disposing the reinforced electrolyte membrane 1 in an electrolytic cell at the time of conditioning operation.

Further, even when the sacrificial thread 24 remains in the electrolyte membrane 10, the sacrificial thread 24 is completely eluted in an aqueous alkaline solution and removed when the reinforced electrolyte membrane 1 is disposed in an electrolytic cell to carry out conditioning operation before regular operation of alkali chloride electrolysis, and therefore a membrane resistance is not influenced at the time of the regular operation of the alkali chloride electrolysis using the reinforced electrolyte membrane 1.

After the reinforced electrolyte membrane 1 is disposed in an electrolytic cell, the reinforced electrolyte membrane 1 will not be influenced by large external force, and therefore breakage such as cracking is less likely to occur to the reinforced electrolyte membrane 1 even when the sacrificial thread 24 is completely eluted in an aqueous alkaline solution and removed.

Other Embodiments

Further, the reinforced electrolyte membrane of the present invention is not limited to examples shown in figures so long as it is a reinforced electrolyte membrane having an electrolyte membrane containing a fluoropolymer having ion exchange groups reinforced by a woven fabric made of a reinforcing thread and a sacrificial thread, wherein the sacrificial thread remains in the electrolyte membrane, a void is formed between the sacrificial thread and the electrolyte membrane, and the above formulae (1) and (2) are satisfied.

For example, the electrolyte membrane 10 is not limited to a laminate comprising the first layer 12 and the second layer 14 shown in figures, and it may be a single layered membrane or a laminate having layers other than the first layer 12 and the second layer 14.

Further, the woven fabric 20 is not limited to one embedded in the first layer 12 as shown in the figures, and it may be embedded in the second layer 14.

Moreover, the sacrificial thread 24 is not limited to a multifilament as shown in the figures, and it may be a monofilament.

Furthermore, the density of the sacrificial thread 24 is not limited to twice of the density of the sacrificial thread 22 shown in the figures, and it may be an even multiple of at least four times.

<Process for Producing Electrolyte Membrane>

The reinforced electrolyte membrane 1 may, for example, be produced via the following step (a) and step (b).

(a) A step of obtaining a reinforced precursor membrane having a precursor membrane containing a fluoropolymer having precursor groups for ion exchange groups reinforced by a woven fabric made of a reinforcing thread and a sacrificial thread.

(b) A step of bringing the reinforced precursor membrane into contact with an aqueous alkaline solution, thereby hydrolyzing and converting the precursor groups into the ion exchange groups to obtain the reinforced electrolyte membrane 1.

(Step (a))

By a coextrusion method, a laminate of a first precursor layer made of a fluoropolymer having precursor groups for carboxylic acid type functional groups and a lower layer of a second precursor layer made of a fluoropolymer having precursor groups for sulfonic acid type functional groups, is obtained.

Separately, by a single layer extrusion method, an upper layer of the second precursor layer made of a fluoropolymer having precursor groups for sulfonic acid type functional groups is obtained.

Then, the upper layer of the second precursor layer, the woven fabric 20 and a laminate film of the lower layer of the second precursor layer and the first precursor layer are arranged in this order and laminated by using a lamination roller or a vacuum lamination apparatus. At that time, the laminate film of the lower layer of the second precursor layer and the first precursor layer is arranged so that the lower layer of the second precursor layer is in contact with the woven fabric 20.

(Fluoropolymer Having Precursor Groups for Carboxylic Acid Type Functional Groups)

The fluoropolymer having precursor groups for carboxylic acid type functional groups may be a copolymer of units derived from a fluoromonomer having a precursor group for a carboxylic acid type functional group and units derived from a fluoroolefin.

The fluoromonomer having a precursor group for a carboxylic acid type functional group is not particularly limited so long as it is a compound having at least one fluorine atom, an ethylenic double bond and a precursor group for a carboxylic acid type functional group in its molecule, and a conventional one may be used.

The fluoromonomer having a precursor group for a carboxylic acid type functional group is preferably a fluorovinyl ether represented by the following formula (3) since it is excellent in production cost of the monomer, reactivity with other monomers and properties of a fluoropolymer obtainable.

$$CF_2=CF-(O)_p-(CF_2)_q-(CF_2CFX)_r-(O)_s-(CF_2)_t-(CF_2CFX')_u-A^1 \quad (3)$$

X is a fluorine atom or a trifluoromethyl group. Further, X' is a fluorine atom or a trifluoromethyl group. In a case where both of X and X' are present in one molecule, they may be the same or different.

$A^1$ is a precursor group for a carboxylic acid type functional group. The precursor group for a carboxylic acid type functional group is a functional group being convertible into the carboxylic acid type functional group by hydrolysis. The functional group being convertible into the carboxylic acid type functional group may, for example, be —CN, —COF, —COOR$^1$ (wherein R$^1$ is a C$_{1\text{-}10}$ alkyl group), or —COONR$^2$R$^3$ (wherein each of R$^2$ and R$^3$ represents a hydrogen atom or a C$_{1\text{-}10}$ alkyl group, and R$^2$ and R$^3$ may be the same or different).

p is 0 or 1, q is an integer of from 0 to 12, r is an integer of from 0 to 3, s is 0 or 1, t is an integer of from 0 to 12, and u is an integer of from 0 to 3, provided that p and s are not 0 at the same time, and r and u are not 0 at the same time. That is, 1≤p+s, and 1≤r+u.

As specific examples of the fluorovinyl ether represented by the formula (3), the following compounds may be mentioned, and from the viewpoint of ensuring easy production, a compound wherein p=1, q=0, r=1, s=0 to 1, t=1 to 3 and u=0 to 1 is preferred.

CF$_2$=CF—O—CF$_2$CF$_2$—COOCH$_3$,
CF$_2$=CF—O—CF$_2$CF$_2$—CF$_2$—COOCH$_3$,
CF$_2$=CF—O—CF$_2$CF$_2$—CF$_2$CF$_2$—COOCH$_3$,
CF$_2$=CF—O—CF$_2$CF$_2$—O—CF$_2$CF$_2$—COOCH$_3$,
CF$_2$=CF—O—CF$_2$CF$_2$—O—CF$_2$CF$_2$—CF$_2$—COOCH$_3$,
CF$_2$=CF—O—CF$_2$CF$_2$—O—CF$_2$CF$_2$—CF$_2$CF$_2$—COOCH$_3$,
CF$_2$=CF—O—CF$_2$—CF$_2$CF$_2$—O—CF$_2$CF$_2$—COOCH$_3$,
CF$_2$=CF—O—CF$_2$CF(CF$_3$)—O—CF$_2$CF$_2$—COOCH$_3$,
CF$_2$=CF—O—CF$_2$CF(CF$_3$)—O—CF$_2$—CF$_2$CF$_2$—COOCH$_3$.

As the fluoroolefin, a C$_{2\text{-}3}$ fluoroolefin having at least one fluorine atom in its molecule is used. The fluoroolefin may, for example, be tetrafluoroethylene (CF$_2$=CF$_2$) (hereinafter referred to as TFE), chlorotrifluoroethylene (CF$_2$=CFCl), vinylene fluoride (CF$_2$=CH$_2$), vinyl fluoride (CH$_2$=CHF), or hexafluoropropylene (CF$_2$=CFCF$_3$), and TFE is particularly preferred since it is excellent in production cost of a monomer, reactivity with other monomers and properties of a fluoropolymer obtainable. As the fluoroolefin, one type may be used alone or two or more of them may be used in combination.

In the present invention, in addition to the fluoromonomer having a precursor group for a carboxylic acid type functional group and the fluoroolefin, other monomers may further be copolymerized. Such other monomers may, for example, be CF$_2$=CF$_2$—R$^f$, CF$_2$=CF—OR$^f$ (wherein R$^f$ is a C$_{1\text{-}10}$ perfluoroalkyl group) and CF$_2$=CFO(CF$_2$)$_v$CF=CF$_2$ (wherein v is an integer of from 1 to 3). By copolymerizing such other monomers, it is possible to improve the flexibility or mechanical strength of the reinforced electrolyte membrane 1. The proportion of such other monomers is preferably at most 30 mass % based on all monomers (100 mass %) from the viewpoint of maintaining ion exchange performance.

The ion exchange capacity of the fluoropolymer obtainable by hydrolyzing precursor groups for carboxylic acid type functional groups is preferably from 0.5 to 2.0 meq/g dry resin when it is used as an ion exchange membrane for alkali chloride electrolysis. The ion exchange capacity of the fluoropolymer obtainable by hydrolyzing the precursor groups for the carboxylic acid type functional groups is preferably at least 0.6 meq/g dry resin, more preferably at least 0.7 meq/g dry resin in view of mechanical strength and electrochemical performance as an ion exchange membrane.

The molecular weight of the fluoropolymer having precursor groups for carboxylic acid type functional groups is preferably at least 150° C., more preferably from 170 to 340° C., furthermore preferably from 170 to 300° C. by the TQ value, in view of mechanical strength and membrane forming property as an ion exchange membrane.

The TQ value is a value relating to the molecular weight of a polymer and is represented by the temperature at which the volume flow rate is 100 mm$^3$/sec. The volume flow rate means the amount of a polymer extruded represented by the unit of mm$^3$/sec when the polymer is melt-extruded from an orifice (diameter: 1 mm, length: 1 mm) at a constant temperature under a pressure of 3 MPa. The TQ value is an index for the molecular weight of a polymer, and the higher the TQ value, the higher the molecular weight.

(Fluoropolymer Having Precursor Groups for Sulfonic Acid Type Functional Groups)

A fluoropolymer having precursor groups for sulfonic acid type functional groups may be a copolymer of units derived from a fluoromonomer having a precursor group for a sulfonic acid type functional group and units derived from a fluoroolefin.

The fluoromonomer having a precursor group for a sulfonic acid type functional group is not particularly limited so long as it is a compound having at least one fluorine atom, an ethylenic double bond and further a precursor group for a sulfonic acid type functional group in its molecule, and conventional monomers may be used.

The fluoromonomer having a precursor group for a sulfonic acid type functional group is preferably a compound represented by the following formula (4) or (5) since it is excellent in production cost of the monomer, reactivity with other monomers and properties of a fluorocopolymer obtainable.

$$CF_2=CF-O-R^{f2}-A^2 \quad (4)$$

$$CF_2=CF-R^{f2}-A^2 \quad (5)$$

$R^{f2}$ is a $C_{1-20}$ perfluoroalkylene group which may contain an etheric oxygen atom, and may be either linear or branched.

$A^2$ is a precursor group for a sulfonic acid type functional group. The precursor group for a sulfonic acid type functional group is a functional group which is convertible to a sulfonic acid type functional group by hydrolysis. The functional group convertible to a sulfonic acid type functional group may, for example, be $-SO_2F$, $-SO_2Cl$ or $-SO_2Br$.

As the compound represented by the formula (4), specifically, the following compounds are preferred.
$CF_2=CF-O-(CF_2)_{1-8}-SO_2F$,
$CF_2=CF-O-CF_2CF(CF_3)O(CF_2)_{1-8}-SO_2F$,
$CF_2=CF[OCF_2CF(CF_3)]_{1-5}SO_2F$.

As the compound represented by the formula (5), specifically, the following compounds are preferred.
$CF_2=CF(CF_2)_{0-8}-SO_2F$,
$CF_2=CF-CF_2-O-(CF_2)_{1-8}-SO_2F$.

As the fluoromonomer having a precursor group for a sulfonic acid type functional group, the following compounds are more preferred from the viewpoint that industrial synthesis is easy.
$CF_2=CFOCF_2CF_2SO_2F$,
$CF_2=CFOCF_2CF_2CF_2SO_2F$,
$CF_2=CFOCF_2CF_2CF_2CF_2SO_2F$,
$CF_2=CFOCF_2CF(CF_3)OCF_2CF_2SO_2F$,
$CF_2=CFOCF_2CF(CF_3)OCF_2CF_2CF_2SO_2F$,
$CF_2=CFOCF_2CF(CF_3)SO_2F$,
$CF_2=CFCF_2CF_2SO_2F$,
$CF_2=CFCF_2CF_2CF_2SO_2F$,
$CF_2=CF-CF_2-O-CF_2CF_2-SO_2F$.

The fluoroolefin may be one previously exemplified, and TFE is particularly preferred since it is excellent in production cost of the monomer, reactivity with other monomers and properties of a fluorocopolymer obtainable. The fluoroolefin may be used alone or in combination of two or more of them.

In the present invention, in addition to the fluoromonomer having a precursor group for a sulfonic acid type functional group and the fluoroolefin, other monomers may further be copolymerized. Such other monomers may be one previously exemplified. By copolymerizing such other monomers, it is possible to improve flexibility or mechanical strength of the reinforced electrolyte membrane 1. The proportion of such other monomers is preferably at most 30 mass % in the entire monomer (100 mass %) from the viewpoint of maintaining ion exchange performance.

The ion exchange capacity of the fluoropolymer obtainable by hydrolyzing precursor groups for sulfonic acid type functional groups is preferably from 0.5 to 2.0 meq/g dry resin when it is used as an ion exchange membrane to be used for alkali chloride electrolysis. The ion exchange capacity of the fluoropolymer obtainable by hydrolyzing precursor groups for sulfonic acid type functional groups is preferably at least 0.6 meq/g dry resin, more preferably at least 0.7 meq/g dry resin in view of mechanical strength or electrochemical performance as an ion exchange membrane.

A molecular weight of the fluoropolymer having precursor groups for sulfonic acid type functional groups is preferably at least 150° C., more preferably from 170 to 340° C., furthermore preferably from 170 to 300° C. by the TQ value, in view of mechanical strength and membrane forming property as an ion exchange membrane.

(Step (b))

The precursor groups for carboxylic acid type functional groups and the precursor groups for sulfonic acid type functional groups of the reinforced precursor membrane thus obtained, are hydrolyzed and converted into carboxylic acid type functional groups and sulfonic acid type functional groups respectively to obtain the reinforced electrolyte membrane 1. A method of the hydrolysis is preferably a method in which a mixture of a water soluble organic compound and an alkali metal hydroxide is used, as described in JP-A-1-140987.

In the step (b), it is preferred that the reinforced precursor membrane is brought into contact with an aqueous alkaline solution, thereby hydrolyzing a part of the sacrificial thread 24 and eluting it in the aqueous alkaline solution so as to satisfy the above formula (2).

The method to satisfy the above formula (2) may, for example, be a method of shortening a time in which the reinforced precursor membrane is brought into contact with the aqueous alkaline solution than heretofore, in the case of using a thread of PET which has been often used as the sacrificial thread 24; or a method of setting the time in which the reinforced precursor membrane is brought into contact with the aqueous alkaline solution, to be the same level as a conventional one, by using, as the sacrificial thread 24, a thread (such as a PET/PBT thread, a PBT thread or a PTT thread) which is less likely to be hydrolyzed as compared with the PET thread.

EXAMPLES

Now, the present invention will be described with reference to Examples, but it should be understood that the present invention is by no means restricted to these Examples.

Examples 1 to 7 are Examples of the present invention, and Examples 8 to 11 are Comparative Examples.

(TQ Value)

The TQ value is a value relating to the molecular weight of a polymer and is one represented by the temperature at which the volume flow rate becomes 100 mm³/sec. The volume flow rate means the extruded amount represented by the unit of mm³/sec when a fluoropolymer having precursor groups for ion exchange groups is melt-extruded from an orifice (diameter: 1 mm, length: 1 mm) at a constant temperature under a pressure of 3 MPa, using a Shimadzu Flow Tester CFD-100D (manufactured by Shimadzu Corporation).

(Ion Exchange Capacity)

About 0.5 g of a fluoropolymer having precursor groups for ion exchange groups was pressed at a temperature higher than TQ value by about 10° C. by a flat plate pressing to obtain a film, this film was analyzed by a transmissive infrared spectral analyzer, and an ion exchange capacity was calculated by using each peak height of a $CF_2$ peak, $CF_3$ peak and an OH peak of spectra obtained.

(Cross-Sectional Area)

A cross section of a reinforced electrolyte membrane dried at 90° C. for at least 2 hours was observed by SEM, cross-sectional areas of sacrificial thread filaments and voids around them were measured by means of an image soft, cross-sectional areas of four filaments and voids around them were averaged, and B, A and B/A were obtained from these averaged values.

(Sacrificial Thread Elution Test)

A reinforced electrolyte membrane was immersed in a 32 mass % sodium hydroxide aqueous solution of which temperature was adjusted to from 20 to 25° C. for 24 hours. The reinforced electrolyte membrane was washed with exchange water, then a cross section of the reinforced electrolyte membrane was observed by SEM, cross-sectional areas of sacrificial thread filaments were measured by means of an image soft, and cross-sectional areas of four filaments were averaged to obtain B.

(Repeated Breaking Test)

A No. 1 dumbbell size test specimen was cut out from a reinforced electrolyte membrane. As a test specimen, four test specimens of which the longitudinal direction agreed with the direction of 45° to the direction of passage between rollers, were prepared.

One end of the test specimen was attached to an upper chuck of a tensile tester, the other end was attached to a lower chuck to interpose the test specimen, so that the distance between these chucks would be 70 mm, a repeated weight application test was carried out at a test speed of 500 mm/min at the upper limit setting weight of 12.5 N at a temperature of from 20 to 25° C., and an average value of the number of weight application until the test specimen was broken, was determined to obtain a number at repeated break.

(Dimensional Change)

Two pieces of test specimens having a length of 1,300 mm in the direction (TD direction) perpendicular to the direction of passage between rollers and a width of 200 mm in the direction (MD direction) of passage between rollers, were prepared from a reinforced electrolyte membrane.

Such a test specimen was immersed in an exchange water of which temperature was adjusted to 25° C., for at least 2 hours, and the dimension in the TD direction was measured by a straight edge ruler. Further, the test specimen was immersed in a 32 mass % sodium hydroxide aqueous solution of which temperature was adjusted to 25° C. and the dimension in the TD direction upon expiration of two hours was measured by a straight edge ruler in the same manner. An average value of two points was determined to calculate the dimensional change (%) from the following formula (6):

Dimensional change (%)=((dimension (mm) in a 32 mass % sodium hydroxide aqueous solution-dimension (mm) in an exchange water)/dimension in an exchange water (mm))×100     (6)

(Breaking Strength)

A reinforced electrolyte membrane was immersed in a 4.9 N sodium chloride aqueous solution for at least 16 hours, and then a No. 1 dumbbell size test specimen was cut out from the reinforced electrolyte membrane. As the test specimen, 5 pieces each in TD direction and in MD direction were prepared.

One end of such a test specimen was attached to an upper chuck of the tensile tester, the other end was attached to a lower chuck thereof to interpose the test specimen so that the distance between these chucks would be 70 mm, and the distance between the chucks was extended at a rate of 50 mm/min at a temperature of from 20 to 25° C. to measure a maximum tensile load (N/cm). An averaged value of 10 test specimens was determined to obtain a breaking strength.

(Electrolysis Voltage, Current Efficiency)

A reinforced electrolyte membrane was disposed in an electrolytic cell for test having an electrolytic surface size of 150 mm×100 mm so that the first layer faced a cathode, and electrolysis of a sodium chloride aqueous solution was carried out under conditions of sodium hydroxide concentration: 32 mass %, sodium chloride concentration: 200 g/L, temperature: 90° C. and current density: 6 kA/m² to measure the electrolysis voltage (V) and the current efficiency (%) after 3 to 10 days from the initiation of operation.

Example 1

TFE and a fluoromonomer having a precursor group for a carboxylic acid type functional group represented by the following formula (3-1) were copolymerized to prepare a fluoropolymer (ion exchange capacity: 1.06 meq/g dry resin, TQ: 225° C.) (hereinafter referred to as polymer C) having precursor groups for carboxylic acid type functional groups.

$$CF_2=CF-O-CF_2CF_2-CF_2-COOCH_3 \qquad (3\text{-}1)$$

TFE and a fluoromonomer having a precursor group for a sulfonic acid type functional group represented by the following formula (4-1) were copolymerized to prepare a fluoropolymer (ion exchange capacity: 1.0 meq/g dry resin, TQ: 235° C.) (hereinafter referred to as polymer S) having precursor groups for sulfonic acid type functional groups.

$$CF_2=CF-O-CF_2CF(CF_3)-O-CF_2CF_2-SO_2F \qquad (4\text{-}1).$$

A polymer C and a polymer S were subjected to a coextrusion method to obtain film A of a two layer structure comprising a first precursor layer (thickness: 12 μm) made of the polymer C and a lower layer (thickness: 68 μm) of a second precursor layer made of the polymer S.

Further, the polymer S was subjected to a melt-extrusion method to obtain film B (thickness: 30 μm) as an upper layer of the second precursor layer.

Monofilament PTFE yarns obtained by rapidly stretching a PTFE film, followed by slitting into 100 denier, and multifilament PET yarns obtained by drawing and twisting six PET filaments of 5 denier, were subjected to plain weaving in an alternating arrangement of two PET yarns to one PTFE yarn, to obtain a reinforcing woven fabric (PTFE yarn density: 10 yarns/cm, PET yarn density: 20 yarns/cm).

The woven fabric and films thus obtained were overlaid in the order of film B, the woven fabric, film A and the releasing PET film (thickness: 100 μm) so that the first precursor layer of the film A would be on the releasing PET film side, and laminated by means of rollers. Then, the releasing PET film was peeled to obtain a reinforced laminated membrane.

A paste comprising 29.0 mass % of zirconium oxide (average particle size: 1 μm), 1.3 mass % of methyl cellulose, 4.6 mass % of cyclohexanol, 1.5 mass % of cyclohexane and 63.6 mass % of water, was transferred by a roll press on the upper layer side of the second precursor layer of the reinforced precursor membrane to attach a gas-releasing covering layer. The attached amount of zirconium oxide was 20 g/m².

A resulting reinforced precursor membrane having a gas-releasing covering layer on one side, was immersed in an aqueous solution of a 5 mass % dimethylsulfoxide and a 30 mass % potassium hydroxide at 95° C. for 8 minutes, thereby hydrolyzing and converting —COOCH₃ of the polymer C and —SO₂F of the polymer S into ion exchange groups to obtain a reinforced electrolyte membrane having a gas-releasing covering layer on one side.

A dispersion having 13 mass % of zirconium oxide (average particle size: 1 μm) dispersed in an ethanol solution containing 2.5 mass % of an acid-form polymer of the polymer S, was prepared. This dispersion was sprayed to the first layer side of the reinforced electrolyte membrane having a gas-releasing covering layer on one side to attach a gas-releasing covering layer, whereby a reinforced electrolyte membrane having gas-releasing covering layers on both sides was obtained. The attached amount of zirconium oxide was 3 g/m$^2$.

The resulting reinforced electrolyte membrane was evaluated. The results are shown in Table 1.

Examples 2 to 11

A reinforced electrolyte membrane having gas-releasing covering layers on both sides, was obtained in the same manner as in Example 1 except that materials for the sacrificial thread, fineness of the sacrificial thread and conditions of hydrolysis treatment of the reinforced precursor membrane were changed as identified in Table 1.

The resulting reinforced electrolyte membrane was evaluated. The results are shown in Table 1.

This application is a continuation of PCT Application No. PCT/JP2013/054964 filed on Feb. 26, 2013, which is based upon and claims the benefit of priority from Japanese Patent Application No. 2012-039532 filed on Feb. 27, 2012. The contents of those applications are incorporated herein by reference in its entirety.

REFERENCE SYMBOLS

1: Reinforced electrolyte membrane
10: Electrolyte membrane
12: First layer
14: Second layer
20: Woven fabric
22: Reinforcing thread
24: Sacrificial thread
26: Filament
28: Void

What is claimed is:

1. A reinforced electrolyte membrane having an electrolyte membrane comprising a fluoropolymer having ion exchange groups, reinforced by a woven fabric comprising a reinforcing thread and a sacrificial thread, wherein

TABLE 1

| | | | Reinforced electrolyte membrane | | | | | | | | |
|---|---|---|---|---|---|---|---|---|---|---|---|
| | Sacrificial thread | | Hydrolysis | Cross-sectional area | | | Elution test | Repeated breaking | Breaking | | Current |
| Ex. | Material | Fineness (Denier) | Time (min) | B (μm$^2$) | A (μm$^2$) | B/A | B (μm$^2$) | test (number) | Dimensional change (%) | strength (N/cm) | Electrolysis voltage (V) | efficiency (%) |
| 1 | PET | 30 | 8 | 1800 | 2800 | 0.7 | 0 | 167 | −3.5 to −4.5 | 50-60 | 3.12 | >96 |
| 2 | PET | 30 | 10 | 1300 | 3000 | 0.4 | 0 | 120 | −3.5 to −4.5 | 50-60 | 3.12 | >96 |
| 3 | PBT | 30 | 8 | 2900 | 3000 | 0.95 | 0 | 781 | −3 to −4 | 65-80 | 3.12 | >96 |
| 4 | PBT | 30 | 15 | 2800 | 3000 | 0.9 | 0 | 743 | −3 to −4 | 65-80 | 3.12 | >96 |
| 5 | PBT/PET 5/5 | 30 | 8 | 2400 | 3000 | 0.8 | 0 | 540 | −3.5-4.5 | 60-70 | 3.12 | >96 |
| 6 | PBT/PET 7/3 | 30 | 8 | 2600 | 3000 | 0.9 | 0 | 630 | −3.5-4.5 | 60-70 | 3.12 | >96 |
| 7 | PTT | 30 | 15 | 2900 | 3000 | 0.95 | 0 | 769 | −3 to −4 | 65-80 | 3.12 | >96 |
| 8 | PET | 30 | 15 | 300 | 3000 | 0.1 | 0 | 49 | −4 to −5 | 40-50 | 3.12 | >96 |
| 9 | PET | 66 | 15 | 750 | 7500 | 0.1 | 0 | 33 | −4 to −5 | 40-50 | 3.12 | >96 |
| 10 | PBT | 66 | 15 | 6800 | 7500 | 0.9 | 0 | 58 | −3.5-4.5 | 40-50 | 3.12 | >96 |
| 11 | PEEK | 30 | 15 | 2900 | 3000 | 0.95 | 2900 | 870 | <−4.5 | 65-80 | 3.17 | >96 |

In Table, PEEK is polyether ether ketone, and a mixed ratio of two types of materials in the materials for a sacrificial thread is represented by mass ratio.

From the results in Table 1, it is found that the reinforced electrolyte membranes in Examples 1 to 7 satisfying the formulae (1) and (2) are excellent in mechanical strength. On the other hand, the reinforced electrolyte membranes in Examples 8 to 10 which do not satisfy the formulae (1) and (2) are inferior in mechanical strength. In Example 11 where PEEK being insoluble in an aqueous alkaline solution is used as a sacrificial thread, electrolysis voltage in alkali chloride electrolysis becomes high.

INDUSTRIAL APPLICABILITY

The reinforced electrolyte membrane of the present invention can be used for alkali chloride electrolysis, diffusion dialysis, ozone-generating electrolysis, electrolytic reduction, a diaphragm for a fuel cell, a polymer catalyst, etc., and particularly, useful as e.g. an ion exchange membrane used for alkali chloride electrolysis.

the sacrificial thread remains in the electrolyte membrane, a void is formed between the sacrificial thread and the electrolyte membrane, and
the following formulae (1) and (2) are satisfied, wherein A is the total of a cross-sectional area of the sacrificial thread and a cross-sectional area of the void, and B is the cross-sectional area of the sacrificial thread:

$$2000 \ \mu m^2 < A < 6000 \ \mu m^2 \quad (1)$$

$$0.3 \leq B/A < 1.0 \quad (2).$$

2. The reinforced electrolyte membrane according to claim 1, wherein the following formula (1') is satisfied:

$$2000 \ \mu m^2 < A < 4000 \ \mu m^2 \quad (1').$$

3. The reinforced electrolyte membrane according to claim 1, wherein the sacrificial thread is a thread comprising at least one member selected from the group consisting of polyethylene terephthalate, polybutylene terephthalate, polytrimethylene terephthalate, rayon and cellulose.

4. The reinforced electrolyte membrane according to claim 1, wherein the sacrificial thread is a thread of polyethylene terephthalate.

5. The reinforced electrolyte membrane according to claim 1, wherein the sacrificial thread is a thread comprising a mixture of polyethylene terephthalate and polybutylene terephthalate.

6. The reinforced electrolyte membrane according to claim 1, wherein the sacrificial thread is a thread of polybutylene terephthalate.

7. The reinforced electrolyte membrane according to claim 1, wherein the sacrificial thread is a thread of polytrimethylene terephthalate.

8. A process for producing the reinforced electrolyte membrane according to claim 1, comprising:
bringing a reinforced precursor membrane having a precursor membrane comprising a fluoropolymer having precursor groups for the ion exchange groups reinforced by a woven fabric comprising a reinforcing thread and a sacrificial thread, into contact with an alkaline aqueous solution, thereby hydrolyzing and converting the precursor groups into the ion exchange groups to produce the reinforced electrolyte membrane.

9. The process for producing a reinforced electrolyte membrane according to claim 8, wherein, at the time of bringing the reinforced precursor membrane into contact with an alkaline aqueous solution, only a part of the sacrificial thread is hydrolyzed and eluted in the alkaline aqueous solution so as to satisfy formula (2).

* * * * *